United States Patent [19]
Flotow

[11] Patent Number: 5,158,165
[45] Date of Patent: Oct. 27, 1992

[54] BACKING PLATE FOR A CLUTCH DISC

[75] Inventor: Richard A. Flotow, Butler, Ind.

[73] Assignee: Dana Corporation, Toledo, Ohio

[21] Appl. No.: 815,084

[22] Filed: Dec. 27, 1991

[51] Int. Cl.$^5$ .................................... F16D 13/60
[52] U.S. Cl. .......................... 192/107 R; 192/107 M; 192/113 R
[58] Field of Search .......... 192/107 R, 107 M, 113 R

[56] References Cited

U.S. PATENT DOCUMENTS

| 2,135,126 | 11/1938 | Harwood | 192/107 M |
| 2,299,028 | 7/1939 | Nutt et al. | 192/107 R |
| 2,348,025 | 4/1941 | Peets et al. | 192/113 |
| 2,355,419 | 8/1944 | Bruce | 192/107 M |
| 2,554,548 | 5/1951 | Albagnac | 192/107 M |
| 3,425,524 | 2/1969 | Dewar | 192/113 R |
| 3,480,117 | 4/1968 | Agren et al. | 188/264 |
| 3,746,139 | 7/1973 | Bok et al. | 192/107 R |
| 3,759,354 | 9/1973 | Dowell et al. | 192/107 R X |
| 3,807,534 | 4/1974 | Eldred | 192/107 R X |
| 3,850,277 | 11/1974 | Adachi | 192/107 R |
| 3,899,050 | 8/1975 | Savary et al. | 188/73.1 |
| 4,202,432 | 5/1980 | Komori | 192/107 M |
| 4,830,164 | 5/1989 | Hays | 192/107 R |
| 4,846,329 | 7/1989 | Kettell et al. | 192/107 M |
| 4,941,559 | 7/1990 | Ishikawa et al. | 192/107 R |

Primary Examiner—Rodney H. Bonck
Assistant Examiner—Andrea Pitts
Attorney, Agent, or Firm—Dykema Gossett

[57] ABSTRACT

A backing plate for connection to a clutch disc includes a pair of spaced friction material portions (or pads). A central channel extends between the two portions to allow air to flow over and cool a central area of the friction material. Clearances are defined at radially inner and outer areas of the channel and receive rivets to secure the backing plate to a clutch disc. The rivets are positioned radially between the radially inner and radially outer edge of the friction material, such that the backing plate is firmly secured to the clutch disc to prevent bowing. The improved backing plate ensures that the backing plate remains firmly secured to the clutch disc, and that the friction material is adequately cooled such that it efficiently transmits rotational forces from a drive source to a driven shaft.

10 Claims, 1 Drawing Sheet

BACKING PLATE FOR A CLUTCH DISC

BACKGROUND OF THE INVENTION

This invention relates to an improvement in attaching friction material to a clutch disc.

Clutch discs are used in clutch assemblies to transmit drive forces from a prime mover to an output shaft. Prior art clutch discs often have a plurality of backing plates each of which has friction material disposed on an outwardly facing surface. The backing plates are spaced circumferentially about the clutch disc, and are selectively engaged with a drive disc to transmit a rotational force drive to an output shaft. In the prior art, the friction material is typically attached to the backing plate, and the backing plate is riveted to the clutch disc.

One problem with the prior art backing plates is that, due primarily to unequal heat distribution, they often pull away from the clutch disc at a central location. Further, the center of the friction material tends to bear the greatest friction and forces. Thus, the friction material at the center of the backing plate heats to a higher temperature then other portions of the friction material. The coefficient of friction at the center of the friction material is then different than at the remainder of the friction material. This may cause the clutch facings to grab upon engagement producing "jerky" vehicular operation, particularly in heavy trucks. These problems are particularly acute with ceramic friction materials which may experience warpage or bowing distortion.

The prior art teaches spacing friction material portions to create air channels therebetween which cool select areas of the friction material. The prior art clutch discs have thus included large spaces between friction material portions. It would be desirable to increase the area covered by the friction material. These prior art structures have also not overcome the aforementioned bowing problem. Thus, it is desirable to improve the prior art backing plates.

SUMMARY OF THE INVENTION

In a disclosed embodiment of the present invention a backing plate is secured to a clutch disc by a plurality of securing members. The backing plate includes a friction material having a radially innermost edge and a radially outermost edge. At least one central securing member is positioned at a radially central location spaced between the radially innermost and radially outermost edges of the friction material, and also at a circumferentially central portion between the two circumferential edges of the friction material. The central securing member prevents the center of the backing plate from bowing away from the clutch disc.

In a preferred embodiment of the present invention a channel extends radially through the entirety of the friction material defining a channel such that cooling air passes over the center of the friction material. A pair of central securing members are positioned at a radially inner and a radially outer location in the channel.

These and other features of the present invention will be best understood from the following specification and drawings, a brief description of which follows.

DETAILED DESCRIPTION OF A PREFERRED EMBODIMENT

Figures 1, 2, 3:
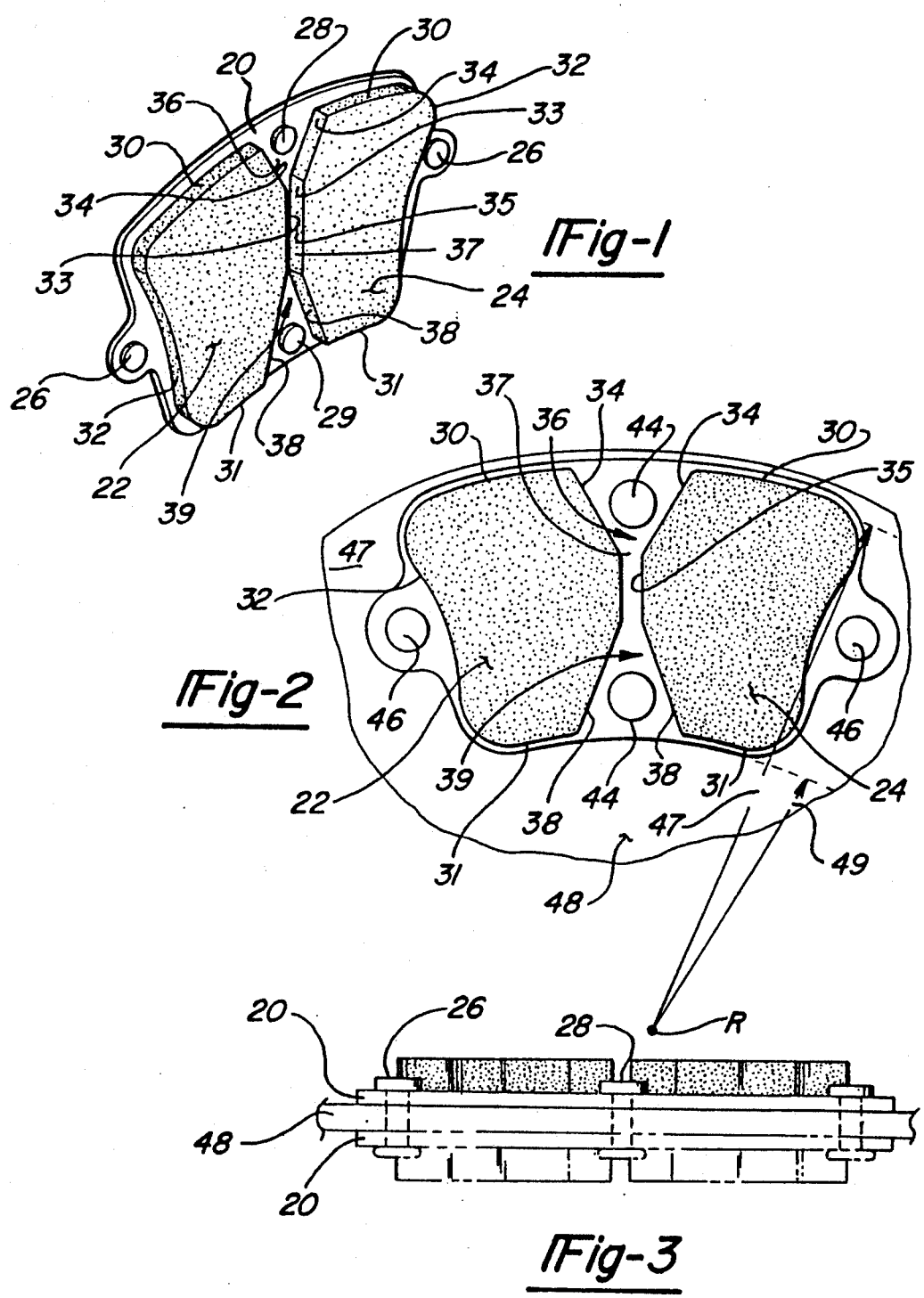
FIG. 1 is a perspective view of the inventive backing plate of the present invention for use with a clutch disc.
FIG. 2 is a front view of the backing plate shown in FIG. 1.
FIG. 3 is an end view of a clutch disc including the inventive backing plate.

FIG. 1 shows a backing plate 20 consisting of a pair of pads 22 and 24 composed of friction material. Backing plate 20 is connected to a clutch disc 48, see FIG. 2, by end rivets 26, a central radially outer rivet 28 and a central radially inner rivet 29. Each pad 22 and 24 has a radially outer edge 30, a radially inner edge 31, a circumferentially outer edge 32, and a circumferentially inner edge 33. Circumferentially inner edge 33 includes a radially outer edge portion 34 extending radially inwardly and towards the opposed pad to a central edge portion 35. The opposed radially outer edge portions 34 define a radially outer gap 36 through which is received the central radially outer rivet 28. The opposed central edge portions 35 define a central gap 37. Radially inner edge portions 38 extend radially inwardly and away from the opposed pad to define a gap 39 which receives central radially inner rivet 29. Gaps 36 and 39 are triangular to maximize the area covered by friction material, while still providing room for rivets 28 and 29.

Central rivets 28 and 29 ensure that backing plate 20 is firmly secured to a clutch disc 48 and will not pull away therefrom. The gaps 36, 37 and 39 define a channel that ensures that the center of the friction material is adequately cooled. In a preferred embodiment, radially outer edge portions 34 each extend at an angle of 30 degrees relative to central edge portions 35. Preferably, radially inner edge portions 38 each extend at an angle of 20 degrees relative to central edge portion 35.

The rivets are omitted in FIG. 2 to show holes or apertures 44 for passage of the central rivets 28 and 29 and apertures 46 for receiving end rivets 26. Rivets 28 and 29 secure backing plate 20 to radially outer portion 47 and radially inner portion 49, respectively, of clutch disc 48. The dimensions are defined about a central axis R of clutch disc 48. Rivets 26 secure the respective circumferentially outer edges of the backing plate 20 to disc 48. Radially outer and radially inner gaps 36 and 39 are both generally triangular.

The radial dimension of clutch disc 48 may be defined as a lateral dimension of backing plate 20, while the circumferential dimension of clutch disc 48 may be defined as a longitudinal dimension of backing plate 20.

Referring to FIG. 3, clutch disc 48 preferably includes a backing plate 20 on each face, with rivets 26 and 28 extending through both backing plates 20 for rigid securement of the plates to clutch disc 48. Clutch disc 48 may be a driven disc in a clutch. The teaching of this invention, however, extends to any type of clutch disc used in any environment.

Friction material sections 22 and 24 are preferably formed of ceramics and bonded to backing plate 20 using known methods. Other known friction materials may be used for this invention.

A preferred embodiment of the present invention has been disclosed. One of ordinary skill in the art, however, would recognize that certain modifications may fall within the spirit and scope of this invention. For that reason the subject matter afforded protection should extend to the subject matter defined in the claims including all fair equivalents thereof.

I claim:

1. A clutch disc comprising:
   a disc body having a center axis;
   at least one backing plate having friction material disposed on an outwardly facing surface, said friction material extending radially from a radially innermost edge to a radially outermost edge and extending circumferentially between two outer circumferential edges;
   said backing plate being secured to said disc body by at least two central securing member passing through said backing plate and into said disc body at a location radially outwardly of said radially innermost edge and intermediate said outer circumferential edges of said friction material;
   said securing member being positioned radially inwardly of said radially outermost edge of said friction material;
   said at least two central securing members securing said backing plate to said disc body, with a radially inner securing member and a radially outer securing member both positioned radially between said radially innermost edge and said radially outermost edge of said friction material; and
   said friction material consists of two discrete friction material portions which are spaced by a radially extending channel, said radially extending channel extending from said radially innermost edge of said friction material to said radially outermost edge of said friction material, and said channel intersecting said radially inner and radially outer securing members.

2. A clutch disc as recited in claim 1, wherein said friction material portions each include an inner edge facing an opposed friction material portion, said inner edges defining said channel, said inner edges having a radially outer edge portion extending radially inwardly and circumferentially towards the other of said friction material portions to a central edge portion, said central edge portion extending generally radially inwardly towards said center axis, and a radially inner edge portion extending radially inwardly and circumferentially away from the opposed friction material portion such that said channel includes generally triangular radially inner and radially outer gaps which receive said securing members.

3. A clutch disc as recited in claim 1, wherein said securing member is a rivet.

4. A clutch disc as recited in claim 1, wherein said friction material is a ceramic.

5. A clutch disc as recited in claim 1, wherein said radially inner and radially outer securing members are circumferentially aligned.

6. A backing plate for use with a clutch disc comprising:
   a backing plate body having at least two longitudinal sides and two lateral sides and at least four rivet holes, one of said four rivet holes being positioned at central portions of each of said longitudinal and lateral sides of said backing plate;
   friction material attached to said backing plate, said friction material extending longitudinally to positions spaced slightly inwardly of said rivet holes on said lateral sides of said backing plate, and said friction material extending laterally between a laterally innermost edge and a laterally outermost edge, said rivet holes on said longitudinal sides being positioned laterally between said laterally innermost and laterally outermost edges of said friction material; and
   said friction material including two discrete friction material portions which are spaced by a laterally extending channel, said laterally extending channel extending from said laterally innermost edge of said friction material to said laterally outermost edge of said friction material, and said channel intersecting said rivet holes on said longitudinal sides.

7. A backing plate as recited in claim 6, wherein each said friction material portions consist of an inner edge facing an opposed friction material portion, said inner edges defining said channel, said inner edges having a first outer lateral edge portion extending laterally inwardly and circumferentially towards the other of said friction material portions to a central edge portion, said central edge portion extending generally laterally to a second outer lateral edge portion, said second outer lateral edge portion extending laterally outwardly and longitudinally away from the opposed friction material portion such that generally triangular laterally outer gaps are defined which receives said rivet holes on said longitudinal sides.

8. A backing plate as recited in claim 6, wherein said friction material is a ceramic.

9. A backing plate for use with a clutch disc comprising:
   backing plate body having at least two longitudinal sides and two lateral sides; and
   friction material attached to said backing plate, said friction material extending longitudinally to positions spaced slightly inwardly of said lateral sides, said friction material extending laterally between a laterally innermost edge and a laterally outermost edge, said friction material having two discrete friction material portions which are spaced by a laterally extending channel, said laterally extending channel extending from said laterally innermost edge to said laterally outermost edge of said friction material, each of said friction material portions having an inner edge facing the opposed friction material portion, said inner edges defining said channel, said inner edges having a first outer lateral edge portion extending laterally inwardly and longitudinally towards the other of said friction material portions to a central edge portion, said central edge portions extending generally laterally to a second outer lateral edge portion, said second outer lateral edge portion extending laterally outwardly and longitudinally away from the opposed friction material portion such that generally triangular laterally outer gaps are defined between said inner edges.

10. A backing plate as recited in claim 9, wherein said friction material is a ceramic.

* * * * *